United States Patent
Jeong (10) Patent No.: US 12,220,942 B2
(45) Date of Patent: Feb. 11, 2025

(54) HUB-INTEGRATED-TYPE CONSTANT-VELOCITY JOINT DEVICE

(71) Applicant: HYUNDAI WIA CORPORATION, Gyeongsangnam-do (KR)

(72) Inventor: Chang Hee Jeong, Yongin-si Gyeonggi-do (KR)

(73) Assignee: HYUNDAI WIA CORPORATION, Gyeongsangnam-do (KR)

( * ) Notice: Subject to any disclaimer, the term of this patent is extended or adjusted under 35 U.S.C. 154(b) by 368 days.

(21) Appl. No.: 17/627,570

(22) PCT Filed: Jul. 14, 2020

(86) PCT No.: PCT/KR2020/009270
§ 371 (c)(1),
(2) Date: Jan. 14, 2022

(87) PCT Pub. No.: WO2021/010733
PCT Pub. Date: Jan. 21, 2021

(65) Prior Publication Data
US 2022/0258530 A1    Aug. 18, 2022

(30) Foreign Application Priority Data
Jul. 15, 2019   (KR) ........................ 10-2019-0085284

(51) Int. Cl.
*B60B 27/00*   (2006.01)
*F16D 3/84*   (2006.01)

(52) U.S. Cl.
CPC ...... *B60B 27/0042* (2013.01); *B60B 27/0005* (2013.01); *B60B 27/0047* (2013.01); *F16D 3/845* (2013.01); *F16D 2300/06* (2013.01); *F16D 2300/08* (2013.01); *F16D 2300/18* (2013.01); *Y10S 464/906* (2013.01)

(58) Field of Classification Search
CPC ............ B60B 27/0042; B60B 27/0005; B60B 27/0047; F16D 3/845; F16D 2300/06; F16D 2300/08; F16D 2300/18; Y10S 464/906
USPC .......................................... 464/175
See application file for complete search history.

(56) References Cited

U.S. PATENT DOCUMENTS

| 11,912,065 B2 * | 2/2024 | Kim ...................... F16C 33/805 |
| 2006/0040752 A1 * | 2/2006 | Ishijima .................. F16D 3/845 |
| | | 464/175 |

FOREIGN PATENT DOCUMENTS

| JP | 2008-115998 A | * | 5/2008 |
| JP | 2012207768 A | | 10/2012 |
| KR | 2019980055469 U | | 10/1998 |
| KR | 1020060089255 A | | 8/2006 |

(Continued)

OTHER PUBLICATIONS

International Search Report of PCT/KR2020/009270, mailed Oct. 15, 2020.

*Primary Examiner* — Greg Binda
(74) *Attorney, Agent, or Firm* — Dickinson Wright PLLC (57) ABSTRACT

A hub-integrated-type constant-velocity joint device in which one hub housing (40) functions as both an outer race of a constant velocity joint and a wheel hub combining a disc (2) of a wheel and a knuckle (3). In this configuration, a boot sealing portion (110) integrally formed at a boot 50' is inserted in a gap (35) between an inner race (32) and an outer race (33) of a bearing (30), thereby functioning as an inner seal closing up the gap between the inner race (32) and the outer race (33).

6 Claims, 6 Drawing Sheets

(56) References Cited

FOREIGN PATENT DOCUMENTS

| | | |
|---|---|---|
| KR | 10-2018-0043966 A | 5/2018 |
| KR | 1020190037395 A | 4/2019 |

* cited by examiner

HUB-INTEGRATED-TYPE CONSTANT-VELOCITY JOINT DEVICE

CROSS-REFERENCE TO RELATED APPLICATIONS

This application is a 35 U.S.C. § 371 national phase of PCT International Application No. PCT/KR2020/009270, filed Jul. 14, 2020, which claims the benefit of priority under 35 U.S.C. § 119 to Korean Patent Application No. 10-2019-0085284, filed Jul. 15, 2019, the contents of which are incorporated herein by reference in their entirety.

TECHNICAL FIELD

The present invention relates to a hub-integrated-type constant-velocity joint device in which a wheel hub and a constant velocity joint are integrated.

BACKGROUND

A joint that is used in a vehicle is a part for transmitting rotational power (torque) to rotary shafts arranged at different angles. A hook joint, a flexible joint, etc. are used for a thrust shaft having a small power transmission angle and a constant velocity joint is used for a driving shaft having a large power transmission angle in front wheel drive vehicles.

The constant velocity joint can smoothly transmit power at a uniform speed even if the cross angle of a driving shaft and a driven shaft is larger, so it is generally used for the axle shaft of a front wheel drive vehicle employing an independent suspension type.

According to the structures of common driving wheels, a wheel hub and a constant velocity joint are separately manufactured, an outer race of the constant velocity joint is coupled to a spline through the wheel hub, and a hub nut is fastened to the end of the outer race passing through the wheel hub, whereby the outer race of the constant velocity joint and the wheel hub are combined.

However, according to the structure of the related art in which the outer race of a constant velocity joint and a wheel hub are separately manufactured and then are assembled by a spline and a hub nut, there is a defect that the weight and the manufacturing cost are increased due to an increase in the number of parts, and particularly, there is a defect that backlash is generated by the spline-coupling and a problem is generated in the quality due to loosening of the hub nut.

A hub-integrated-type constant-velocity joint device has been developed to remove the defects described above. A hub-integrated-type constant-velocity joint is an apparatus in which a drive shaft that is a shaft for transmitting power from an engine to wheels and wheel bearings for connecting the drive shaft to the wheel are integrated, and is also called an integrated drive axle (IDA).

Figure 1:
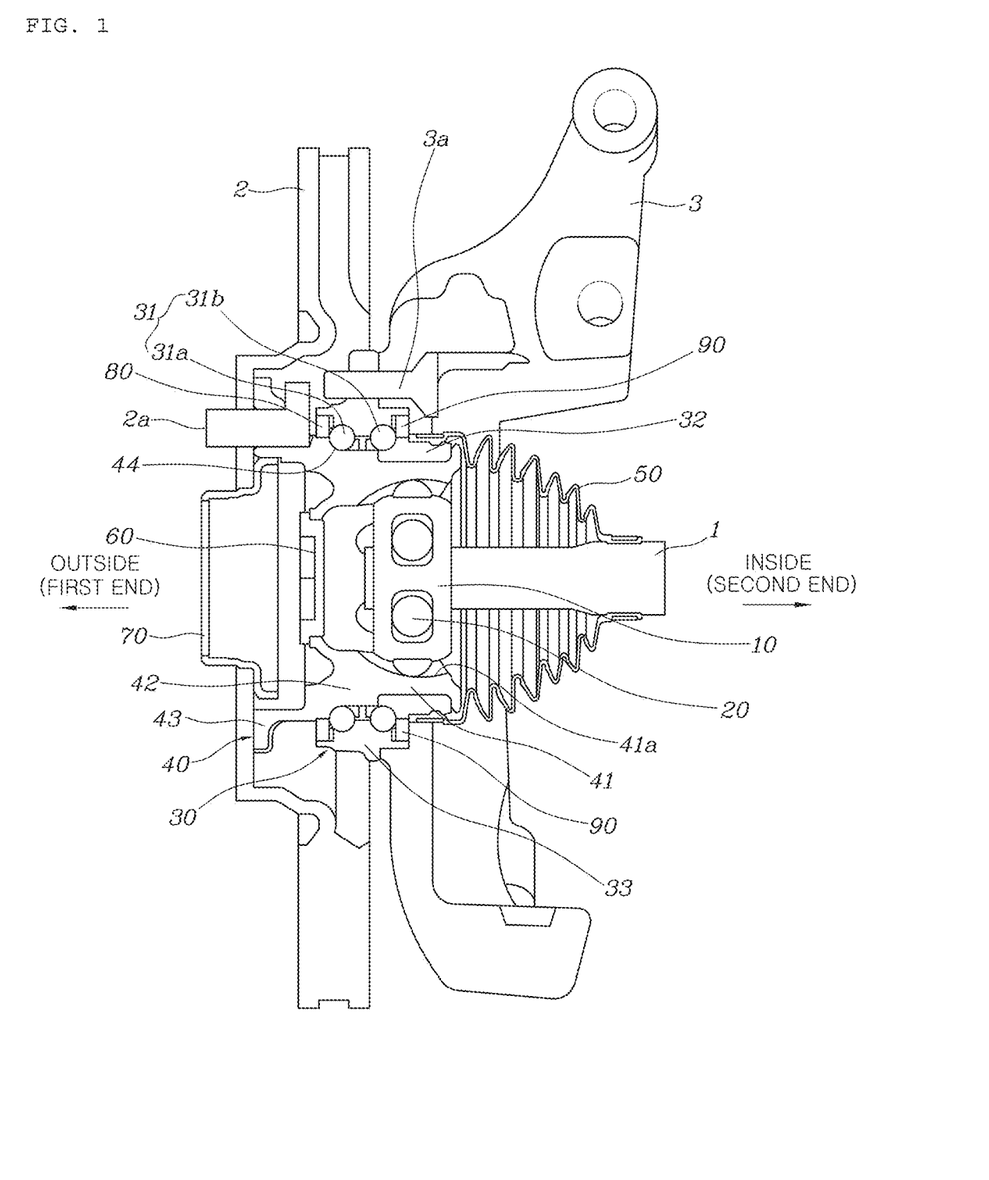
FIG. 1 is a cross-sectional view of a hub-integrated-type constant-velocity joint device of the related art.
Figure 2:
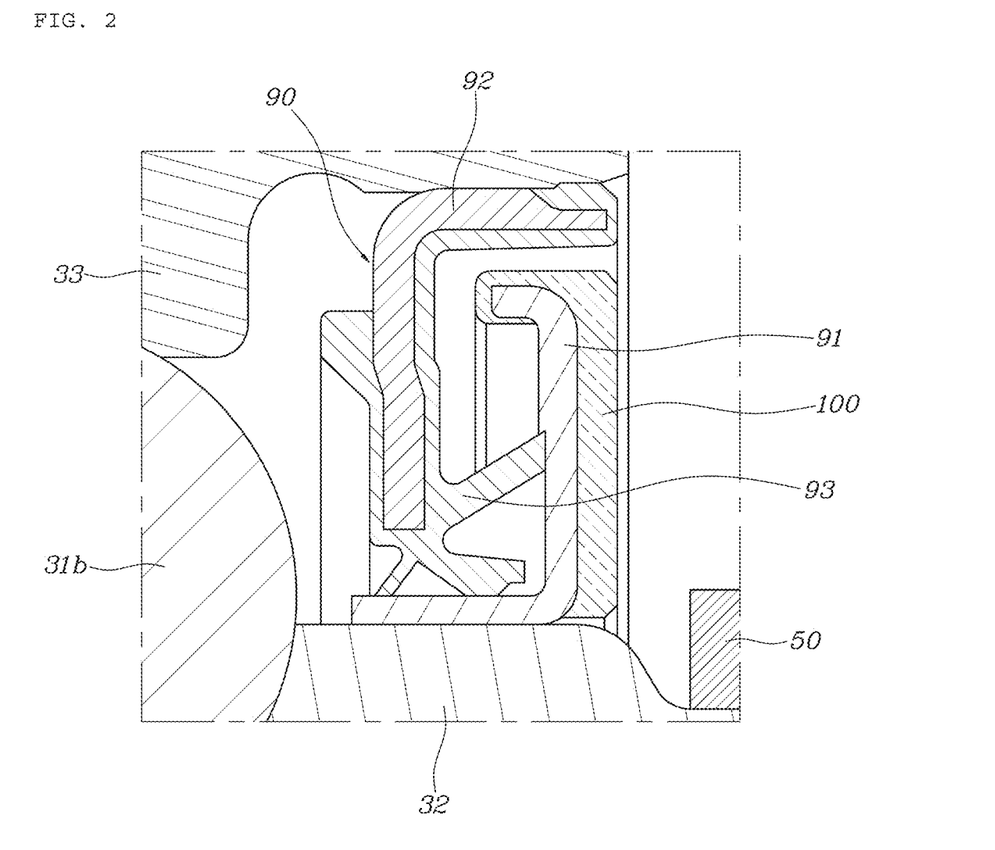
FIG. 2 is an enlarged view of the portion where an inner seal is coupled in FIG. 1.

FIGS. 1 and 2 show the structure of a common hub-integrated-type constant-velocity joint in the related art. This hub-integrated-type constant-velocity joint includes an inner race 10 coupled to a first end of a driveshaft 1, several joint balls 20 coupled to the inner race 10, and a hub housing 40 in which the inner race 10 is inserted together with the joint balls 20 and on which a bearing 30 is fitted.

The driveshaft 1 transmits engine power, which is transmitted through a transmission, to wheels.

Constant velocity joints are classified into a ball joint and a tripod joint, and the inner race 10 and the joint balls 20 are components of the ball joint.

One hub housing 40 functions as an outer race of the constant velocity joint and as a wheel hub for combining a wheel and a knuckle. Accordingly, as compared with the structure of the related art in which the outer race of a constant velocity joint and a wheel hub are separately manufactured and the combined by a hub nut, it is possible to reduce the weight and the manufacturing cost by decreasing the number of parts and to remove joint noise and backlash that are generated when power is transmitted. Further, particularly, there is the advantage that it is possible to achieve high rigidity by removing the problem of loosening of a hub nut.

The hub housing 40 has a hub part 41 having a groove 41a in which the joint balls 20 are inserted on the inner surface thereof and having an arc shape being open at a first end toward the inside of a vehicle and being open at a second end toward the outside of the vehicle, a housing part 42 extending from the hub part 41 toward the outside of the vehicle to receive the second end of the hub part 41 therein, and a flange part 43 radially extending from an end of the housing part 42 to couple the disc 2 of a wheel.

The groove 41a of the hub housing 40 is formed in the same number as the number of the joint balls 20 and extend in the inside-outside direction of the vehicle.

The first open end (inward end) of the hub 41 of the hub housing 40 is covered with a boot 50' and a hub cap 60 is coupled to the second open end (outward end) of the hub 41.

The driveshaft 1 can be inserted and assembled inside the vehicle through the open second end (outward end) of the hub 41, so it is possible to improve work convenience when assembling the driveshaft 1.

The space inside the hub part 41 is sealed by the boot 50' and the hub cap 60, whereby it is possible to prevent leakage of grease and entrance of foreign substances.

A wheel guide 70 is fitted on the flange 43 of the hub housing 40. The wheel guide 70 functions as an assembly guide of the disc 2 while passing through the center 2 of the disc 2 when the disc 2 is coupled to the flange part 43 by bolts 2a.

The bearing 30 includes bearing balls 31 composed of outer balls 41a and inner balls 31b that are spaced apart from each other in the inside-outside direction of the vehicle on the outer surface of the housing part 42, an inner race 32 fixing the positions of the inner balls 31b by supporting the inner balls 31b, and an outer race 33 covering both the outer balls 31a and the inner balls 31b and coupled to the knuckle 3.

The positions of the outer balls 31a are fixed by a ball supporting portion 44 integrally formed at the housing part 42.

That is, the ball supporting portion 44 functions as an inner race for the outer balls 31a, so there is no need for an inner race that is a separate part for supporting the outer balls 31a. Accordingly, it is possible to reduce the number of parts, the weight, the manufacturing cost, and the number of processes, thereby being able to improve productivity.

The outer race 33 and the knuckle 3 are assembly by a bolt 3a or a screw.

A first end of the boot 50' that faces the inside is coupled and fixed to the outer surface of the driveshaft 1 by a clamp and a second end thereof that faces the outside is coupled and fixed on the inner race 32 by a clamp.

Grease for lubrication between the bearing balls 31 and inner race 32, which are rotary parts, and the outer race 33 that is a fixed part is applied to the bearing 30. An outer seal 80 is coupled to the sides of the outer ball 31a to prevent leakage of the grease, whereby airtightness is maintained.

Further, an inner seal 90 is coupled to the sides of the inner ball 31*b*, whereby airtightness is maintained.

The inner seal 90, as shown in FIG. 2, includes an inner race-fixing steel ring 91, an outer race-fixing steel ring 92, and a rubber seal 93 for maintaining airtightness. If other surrounding parts can perform the function of the inner seal 90, it would be possible to reduce the number of parts and the weight and to greatly decrease the manufacturing cost.

Reference numeral '100' shown in FIG. 2 indicates an encoder that is a sensor detecting rotation speed and direction and the encoder is coupled to the inner race-fixing steel ring 91.

The description provided above as a related art of the present invention is just for helping understanding the background of the present invention and should not be construed as being included in the related art known by those skilled in the art.

There is KR 10-2018-0043966A as related art.

SUMMARY

An objective of the present disclosure is to be able to reduce the number of parts and the weight and greatly decrease the manufacturing cost by enabling a boot to function as an inner seal in a hub-integrated-type constant-velocity joint device in which a hub housing function as an outer race of a constant velocity joint and as a wheel hub for combining the disc of a wheel and a knuckle.

In order to achieve the objectives of the present disclosure, a hub-integrated-type constant-velocity joint device includes a hub part in which an inner race of a constant joint and a ball joint are inserted, a housing part extending to an outside of a vehicle from the hub part, and a hub housing having an integrally formed flange part radially extending from an end of the housing part to couple a disc of a wheel, in which a bearing including bearing balls composed of outer balls and inner balls, an inner race supporting inner sides of the inner balls, and outer race covering outer sides of both the outer balls and the inner balls and coupled to a knuckle; and a second end, which faces the outside of the vehicle, of a boot coupled to surround the hub part and a driveshaft is inserted in a gap between the inner race and the outer race of the bearing, thereby functioning as an inner seal closing up the gap between the inner race and the outer race.

A circular ring-shaped solid boot sealing portion may be integrally formed at the second end of the booth which faces the outside of the vehicle; and the boot sealing portion may be inserted in the gap between the inner race and the outer race.

The boot sealing portion may be installed such that an inner surface thereof is in contact with an outer surface of the inner race and an outer surface thereof is in contact with an inner surface of the outer race; several outer protrusions may be formed on the outer surface of the boot sealing portion in a longitudinal direction of the boot sealing portion; and grooves between the outer protrusions may be filled with grease.

When the boot sealing portion is inserted in the gap between the inner race and the outer race of the bearing, the second end of the boot which is connected with the boot sealing portion may be in contact with a side of the outer race, thereby maintaining sealing.

A lateral protrusion that protrudes in the same direction as the boot sealing portion may be formed at the second end of the boot, which is connected with the boot sealing portion, and may be in contact with the side of the outer race, thereby maintaining sealing.

A concave seat may be formed on the outer surface of the inner race; the second end of the boot that is connected with the boot sealing portion may be inserted in the seat, thereby maintaining sealing; and a clamp may be fastened to the second end of the boot that is inserted in the seat, whereby the second end of the booth which faces the outside of the vehicle may be coupled and fixed to the inner race of the bearing.

The boot sealing portion and the second end of the boot which is connected with the boot sealing portion may be made of the same material.

The boot sealing portion and the second end of the boot which is connected with the boot sealing portion may be divided into a first contact portion being in contact with the inner race of the bearing which is a rotary part and a second contact portion being in contact with the outer race of the bearing which is a fixed part; and the second contact portion may be made of a low-friction material that generates less friction than the first contact portion.

An encoder configured to detect rotation speed and direction may be coupled to the second end of the booth which is connected with the boot sealing portion.

Further, there is provided a hub-integrated-type constant-velocity joint device in which one hub housing functions as both an outer race of a constant velocity joint and a wheel hub combining a disc and a knuckle, in which a bearing is coupled to an outer surface of the hub housing; and a second end of a booth which faces an outside of a vehicle is inserted in a gap between an inner race and an outer race of the bearing, thereby functioning as an inner seal closing up the gap between the inner race and the outer race.

According to an embodiment of the present disclosure described above, in a hub-integrated-type constant-velocity joint device in which one hub housing functions as both an outer race of a constant velocity joint and a wheel hub combining a disc of a wheel and a knuckle, a boot sealing portion integrally formed at a boot is inserted in the gap between an inner race and an outer race of a bearing, thereby functioning as an inner seal closing up the gap between the inner race and the outer race. Accordingly, it is possible to remove an inner seal that is used in the related art. Therefore, it is possible to reduce the number of parts and the weight and greatly decrease the manufacturing cost. Further, it is possible to improve productivity by reducing the assembly process.

DETAILED DESCRIPTION

Hereafter, a hub-integrated-type constant-velocity joint device according to an exemplary embodiment of the present disclosure is described and the same components as those in the related art are given the same reference numerals in the following description.

A hub-integrated-type constant-velocity joint device according to the present disclosure, as shown in FIGS. 3 to 6, includes an inner race 10 coupled to a first end of a driveshaft 1, several joint balls 20 coupled to the inner race 10, and a hub housing 40 in which the inner race 10 is inserted together with the joint balls 20 and on which a bearing 30 is fitted.

Figure 3:
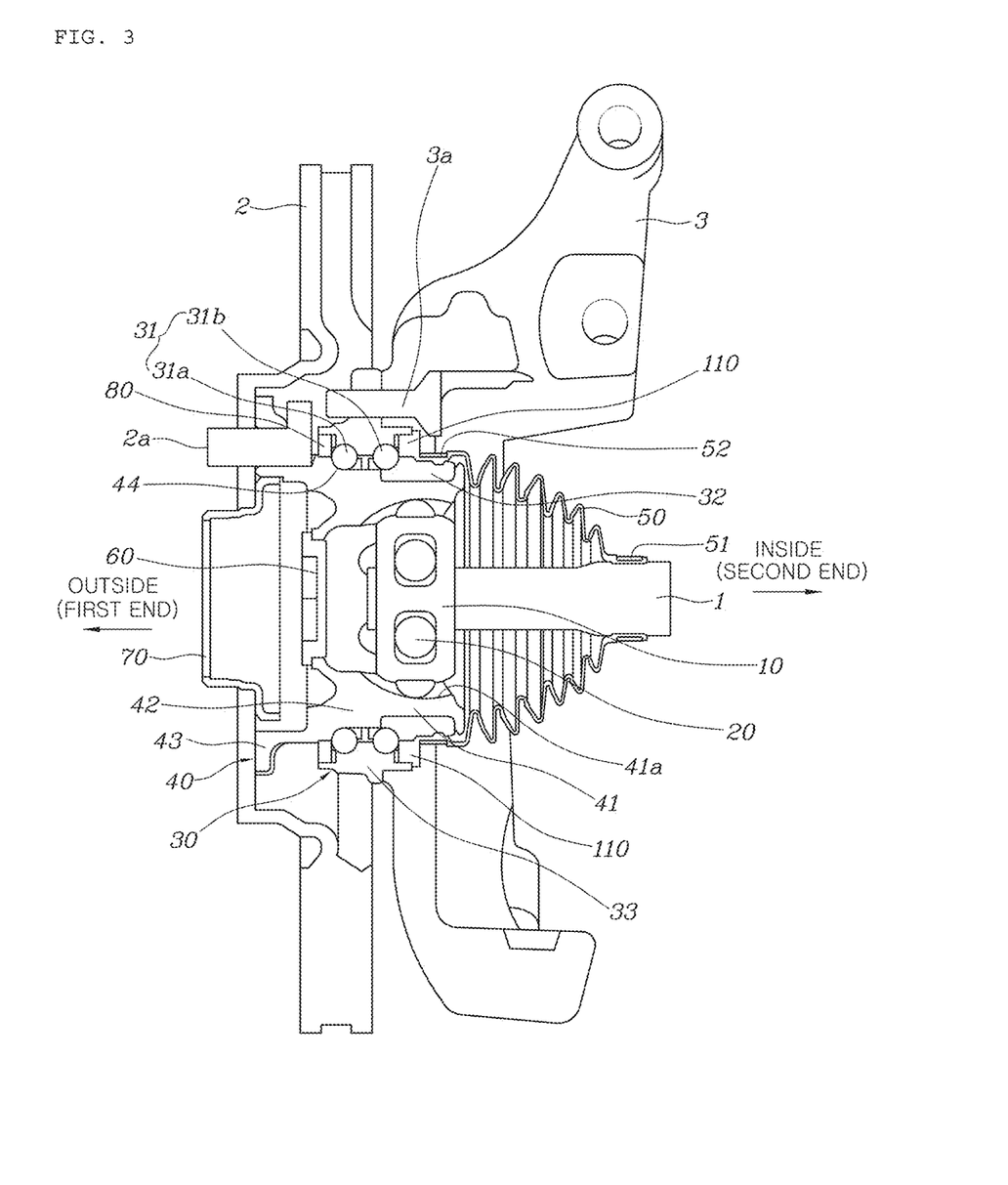
FIG. 3 is a cross-sectional view of a hub-integrated-type constant-velocity joint device according to the present invention.

The driveshaft 1 transmits engine power, which is transmitted through a transmission, to wheels.

Constant velocity joints are classified into a ball joint and a tripod joint, and the inner race 10 and the joint balls 20 are components of the ball joint.

One hub housing 40 functions as an outer race of the constant velocity joint and as a wheel hub for combining a disc 2 of a wheel and a knuckle 3. Accordingly, as compared with the structure of the related art in which the outer race of a constant velocity joint and a wheel hub are separately manufactured and the combined by a hub nut, it is possible to reduce the weight and the manufacturing cost by decreasing the number of parts and to remove joint noise and backlash that are generated when power is transmitted. Further, particularly, there is the advantage that it is possible to achieve high rigidity by removing the problem of loosening of a hub nut.

The hub housing 40 has a hub part 41 having a groove 41a in which the joint balls 20 are inserted on the inner surface thereof and having an arc shape being open at a first end toward the inside of a vehicle and being open at a second end toward the outside of the vehicle, a housing part 42 extending from the hub part 41 toward the outside of the vehicle to receive the second end of the hub part 41 therein, and a flange part 43 radially extending from an end of the housing part 42 to couple the disc 2 of a wheel.

The groove 41a of the hub housing 40 is formed in the same number as the number of the joint balls 20 and extend in the inside-outside direction of the vehicle.

The first open end (inward end) of the hub 41 of the hub housing 40 is covered with a boot 50' and a hub cap 60 is coupled to the second open end (outward end) of the hub 41.

The driveshaft 1 can be inserted and assembled inside the vehicle through the open second end (outward end) of the hub 41, so it is possible to improve work convenience when assembling the driveshaft 1.

The space inside the hub part 41 is sealed by the boot 50' and the hub cap 60, whereby it is possible to prevent leakage of grease and entrance of foreign substances.

A wheel guide 70 is fitted on the flange 43 of the hub housing 40. The wheel guide 70 functions as an assembly guide of the disc 2 while passing through the center 2 of the disc 2 when the disc 2 is coupled to the flange part 43 by bolts 2a.

The bearing 30 includes bearing balls 31 composed of outer balls [[4]]31a and inner balls 31b that are spaced apart from each other in the inside-outside direction of the vehicle on the outer surface of the housing part 42, an inner race 32 fixing the position of the inner balls 31b by supporting the inner balls 31b, and an outer race 33 covering both the outer balls 31a and the inner balls 31b and coupled to the knuckle 3.

The positions of the outer balls 31a are fixed by a ball supporting portion 44 integrally formed at the housing part 42.

That is, the ball supporting portion 44 functions as an inner race for the outer balls 31a, so there is no need for an inner race that is a separate part for supporting the outer balls 31a. Accordingly, it is possible to reduce the number of parts, the weight, the manufacturing cost, and the number of processes, thereby being able to improve productivity.

The outer race 33 and the knuckle 3 are assembly by a bolt 3a or a screw.

A first end of the boot 50' that faces the inside of a vehicle is coupled and fixed to the outer surface of the driveshaft 1 by a clamp 51 and a second end thereof that faces the outside of the vehicle is coupled and fixed on the inner race 32 by a clamp 52.

Grease for lubrication between the bearing balls 31 and inner race 32, which are rotary parts, and the outer race 33 that is a fixed part is applied to the bearing 30. An outer seal 80 is coupled to the sides of the outer ball 31a to prevent leakage of the grease, whereby airtightness is maintained. Further, the second end of the boot 50' that faces the outside of a vehicle is coupled to the sides of the inner balls 31b in accordance with the present invention, thereby functioning as an inner seal for maintaining airtightness.

That is, the second end, which faces the outside of a vehicle, of the boot 50' coupled to cover the driveshaft 1 and the hub part 41 of the hub housing 40 is inserted in the gap 35 between the inner race 32 and the outer race 33 of the bearing 30, thereby functioning as an inner seal that closes up the gap between the inner race 32 and the outer race 33.

When the second end of the boot 50' functioning as an inner seal of the related art, it is possible to remove all the inner race-fixing steel ring, the outer race-fixing steel ring, and the rubber seal that constitute the inner seal. Accordingly, it is possible to reduce the number of parts and the weight and greatly decrease the manufacturing cost. Further, it is possible to improve productivity by reducing the assembly process.

Figure 4:
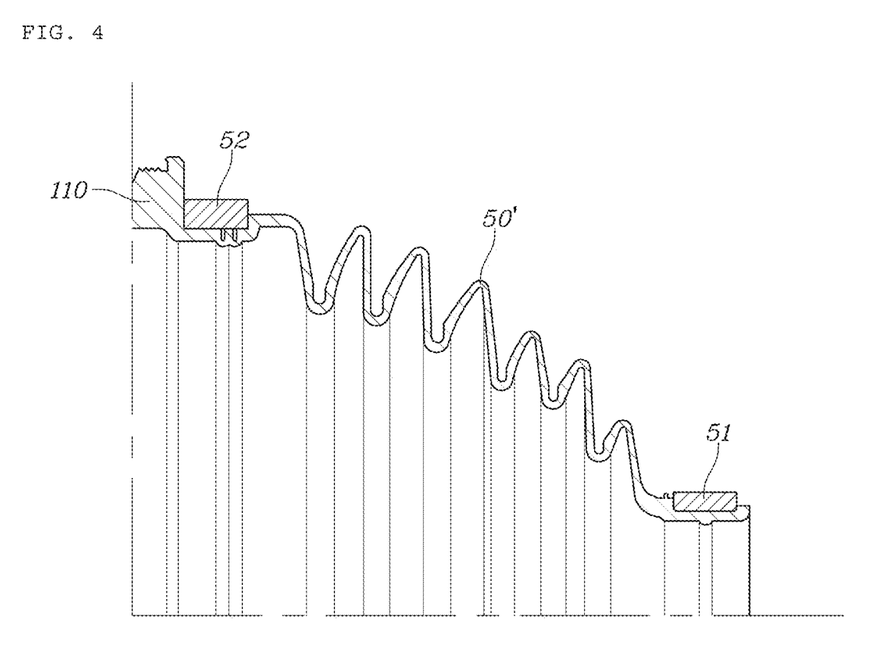
FIG. 4 is a cross-sectional view of a boot having a boot sealing portion according to the present invention.
Figure 5:
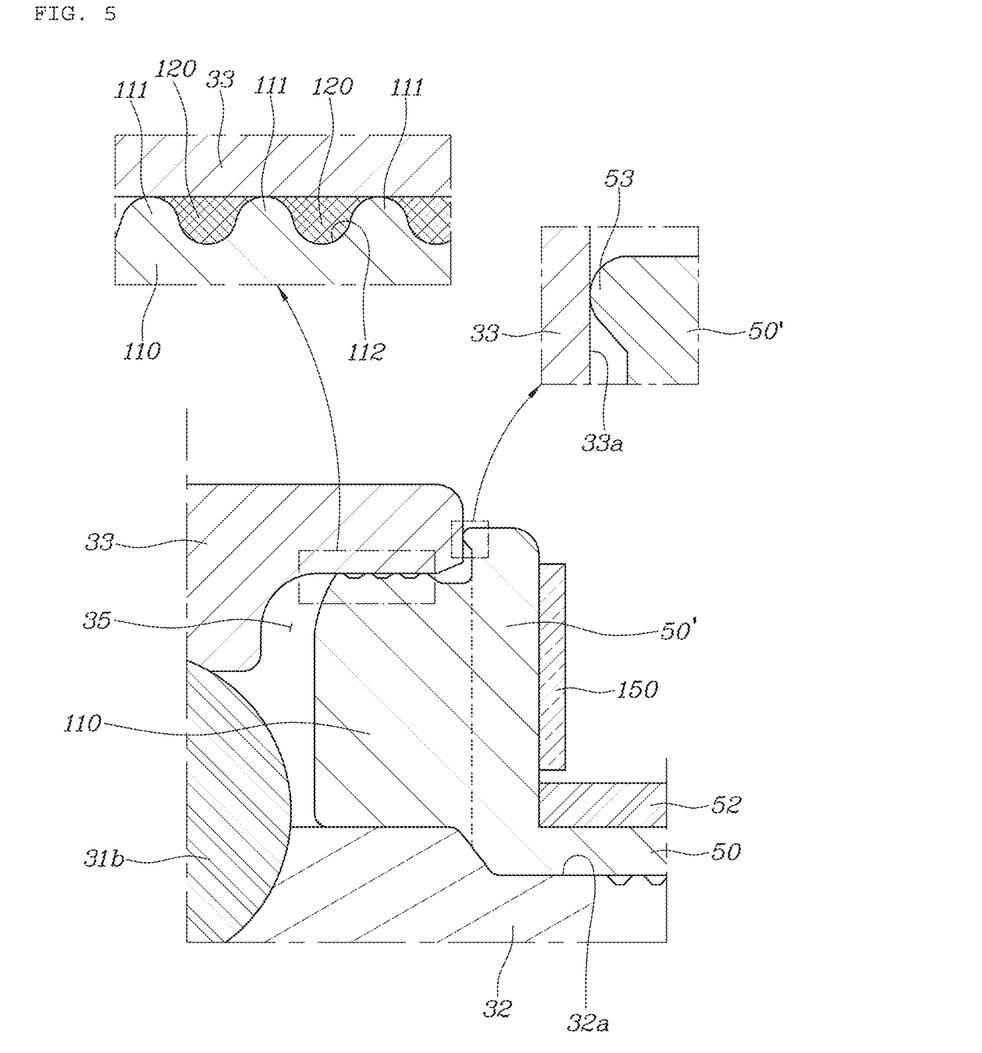
FIGS. 5 to 6 are views illustrating an embodiment of the boot sealing portioning according to the present invention.

This configuration is described in more detail. A circular ring-shaped solid boot sealing portion 110 is integrally formed at the second end of the boot 50' which faces the outside of a vehicle and is inserted in the gap 35 between the inner race 32 and the outer race 33 of the bearing 30, thereby functioning as an inner seal.

In the boot sealing portion 110 inserted in the gap 35 between the inner race 32 and the outer race 35, the inner surface is in contact with the outer surface of the inner race 32 and the outer surface is in contact with the inner surface of the outer race 33. Several outer protrusions 111 are formed on the outer surface of the boot sealing portion 110 in the longitudinal direction (inside-outside direction) of the boot sealing portion 110 and the grooves 112 between the outer protrusions 111 are filled with grease 120.

The grease 120 in the grooves 112 between the outer protrusions 111 reduces drag torque and friction heat and increases durability.

When the boot sealing portion 110 formed at the second end of the boot 50' is inserted in the gap 35 between the inner race 32 and the outer race 33 of the bearing 50, as described above, the second end of the boot 50' which is connected with the boot sealing portion 110 is in contact with a side 33a of the outer race 33, thereby maintaining sealing.

A lateral protrusion 53 that protrudes in the same direction as the boot sealing portion 110 is formed at the second end of the boot 50', which is connected with the boot sealing portion 110, and is in contact with the side 33a of the outer race 33, thereby maintaining sealing.

A concave seat 32a is formed on the outer surface of the inner race 32 and the second end of the boot 50' that is connected with the boot sealing portion 11 is inserted in the seat 32a, thereby maintaining sealing. The clamp 52 is fastened to the second end of the boot 50' that is inserted in the seat 32a, whereby the second end of the boot[[h]]50' which faces the outside of a vehicle is coupled and fixed to the inner race 32 of the bearing 30.

As an example according to the present invention, the boot sealing portion 110 and the boot 50' that is connected with the boot sealing portion 110 may be made of the same material.

Nitrile rubber having excellent alkali resistance, water resistance, oil resistance, and wear resistance may be used for common seals. When the boot sealing portion 110 and the boot 50' are made of the same material, they may be made of NRB00320 or NRB01370.

Figure 6:
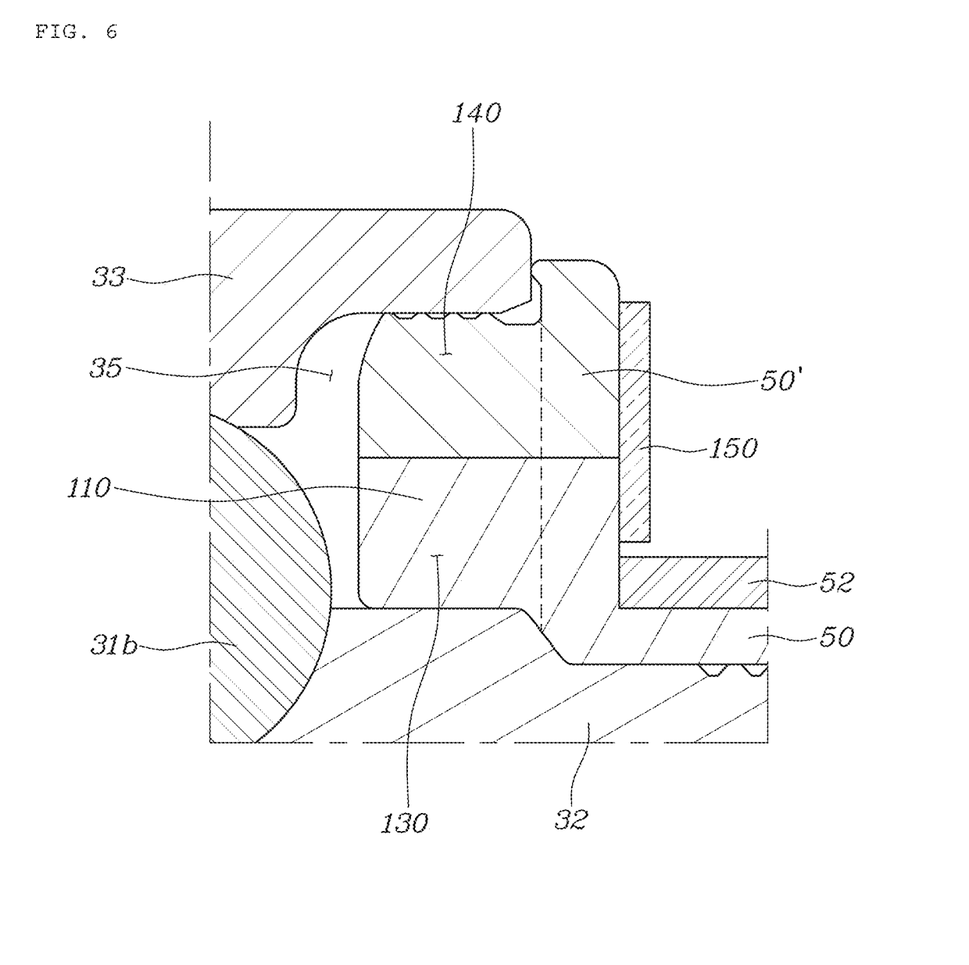

As another example, as shown in FIG. 6, the boot sealing portion 110 and the boot 50' connected with the boot sealing portion 110 may be divided into a first contact portion 130 being in contact with the inner race 32 of the bearing 30 which is a rotary part and a second contact portion 140 being in contact with the outer race 33 of the bearing 30 which is a fixed part. In this case, the second contact portion 140 may be made of a low-friction material that generates less friction than the first contact portion 130 to maximally prevent wear.

The first contact portion 130 may be made of NRB00320 or NRB01370 and the second contact portion 140 may be made of NRB00935 that is a low-friction material in comparison to the first contact portion 130, but they are not limited thereto.

An encoder 150 that detects rotation speed and direction is coupled to the second end of the boot 50' which is connected with the boot sealing portion 110.

According to an embodiment of the present disclosure described above, in a hub-integrated-type constant-velocity joint device in which one hub housing 40 functions as both an outer race of a constant velocity joint and a wheel hub combining the disc 2 of a wheel and the knuckle 3, the boot sealing portion 110 integrally formed at the boot 50' is inserted in the gap 35 between the inner race 32 and the outer race 33 of the bearing 30, thereby functioning as an inner seal closing up the gap between the inner race 32 and the outer race 33. Accordingly, it is possible to remove an inner seal that is used in the related art. Therefore, it is possible to reduce the number of parts and the weight and greatly decrease the manufacturing cost. Further, it is possible to improve productivity by reducing the assembly process.

Although the present disclosure was described with reference to specific embodiments shown in the drawings, it is apparent to those skilled in the art that the present invention may be changed and modified in various ways without departing from the scope of the present invention which is described in the following claims.

| Reference Numerals | |
| --- | --- |
| 1 - driveshaft | 2 - disc |
| 3 - knuckle | 10 - inner race |
| 20 - joint ball | 30 - bearing |
| 31 - bearing ball | 31a - outer ball |
| 31b - inner ball | 32 - inner race |
| 33 - outer race | 40 - hub housing |
| 41 - hub part | 42 - housing part |
| 43 - flange part | 44 - ball supporting portion |
| 50 - boot | 53 - lateral protrusion |
| 60 - hub cap | 70 - wheel guide |
| 80 - outer seal | 110 - boot sealing portion |
| 111 - outer protrusion | 120 - grease |
| 130 - first contact portion | 140 - second contact portion |
| 150 - encoder | |

The invention claimed is:

1. A hub-integrated-type constant-velocity joint device comprising a hub part in which an inner race of a constant joint and a ball joint are inserted, a housing part extending to an outside of a vehicle from the hub part, and a hub housing having an integrally formed flange part radially extending from an end of the housing part to couple a disc of a wheel,
wherein a bearing including bearing balls composed of outer balls and inner balls, an inner race supporting inner sides of the inner balls, and outer race covering outer sides of both the outer balls and the inner balls and coupled to a knuckle; and
a second end, which faces the outside of the vehicle, of a boot coupled to surround the hub part and a driveshaft is inserted in a gap between the inner race and the outer race of the bearing, configured as an inner seal closing up the gap between the inner race and the outer race;
a boot sealing portion is integrally formed at the second end of the boot which faces the outside of the vehicle;
the boot sealing portion is inserted in the gap between the inner race and the outer race;
a lateral protrusion that protrudes in the same direction as the boot sealing portion is formed at the second end of the boot, which is connected with the boot sealing portion, and is in contact with the side of the outer race, thereby maintaining sealing;
a concave seat is formed on the outer surface of the inner race on the same line as the lateral protrusion; and
the second end of the boot that is connected with the boot sealing portion is inserted in the seat, thereby maintaining sealing.

2. The hub-integrated-type constant-velocity joint device of claim 1, wherein
a clamp is fastened to the second end of the boot that is inserted in the seat, whereby the second end of the boot which faces the outside of the vehicle is coupled and fixed to the inner race of the bearing.

3. The hub-integrated-type constant-velocity joint device of claim 1, wherein the boot sealing portion and the second end of the boot which is connected with the boot sealing portion are made of the same material.

4. The hub-integrated-type constant-velocity joint device of claim 1, wherein an encoder configured to detect rotation speed and direction is coupled to the second end of the boot which is connected with the boot sealing portion.

5. A hub-integrated-type constant-velocity joint device comprising a hub part in which an inner race of a constant joint and a ball joint are inserted, a housing part extending to an outside of a vehicle from the hub part, and a hub housing having an integrally formed flange part radially extending from an end of the housing part to couple a disc of a wheel,
wherein a bearing including bearing balls composed of outer balls and inner balls, an inner race supporting inner sides of the inner balls, and outer race covering outer sides of both the outer balls and the inner balls and coupled to a knuckle;
a second end, which faces the outside of the vehicle, of a boot coupled to surround the hub part and a driveshaft, the second end defining a circular ring-shaped solid boot sealing portion that is inserted in a gap between the inner race and the outer race of the bearing, thereby functioning configured as an inner seal closing up the gap between the inner race and the outer race;
wherein the boot sealing portion is installed such that an inner surface thereof is in contact with an outer surface of the inner race and an outer surface thereof is in contact with an inner surface of the outer race;

several outer protrusions are formed on the outer surface of the boot sealing portion in a longitudinal direction of the boot sealing portion; and grooves between the outer protrusions are filled with grease.

6. A hub-integrated-type constant-velocity joint device comprising a hub part in which an inner race of a constant joint and a ball joint are inserted, a housing part extending to an outside of a vehicle from the hub part, and a hub housing having an integrally formed flange part radially extending from an end of the housing part to couple a disc of a wheel, wherein a bearing including bearing balls composed of outer balls and inner balls, an inner race supporting inner sides of the inner balls, and outer race covering outer sides of both the outer balls and the inner balls and coupled to a knuckle;

a second end, which faces the outside of a vehicle, of a boot coupled to surround the hub part and a driveshaft, the second end defining a circular ring-shaped solid boot sealing portion that is inserted in a gap between the inner race and the outer race of the bearing, thereby functioning configured as an inner seal closing up the gap between the inner race and the outer race;

wherein the boot sealing portion and the second end of the boot which is connected with the boot sealing portion are divided into a first contact portion being in contact with the inner race of the bearing which is a rotary part and a second contact portion being in contact with the outer race of the bearing which is a fixed part; and the second contact portion is made of a low-friction material that generates less friction than the first contact portion.

* * * * *